N. T. EDSON.
Hub.
No. 20,869. Patented July 13, 1858.
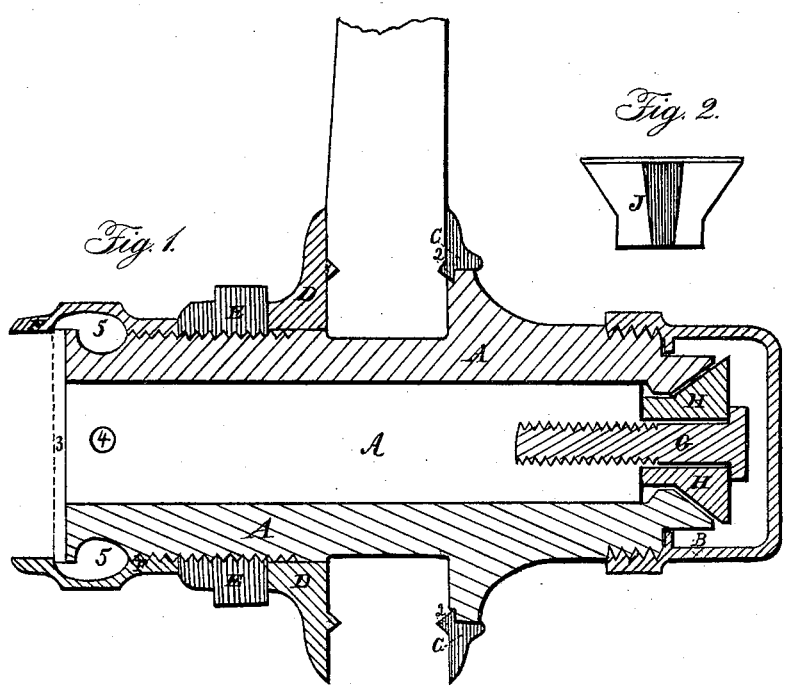
Witnesses:
Inventor:

UNITED STATES PATENT OFFICE.

N. T. EDSON, OF NEW ORLEANS, LOUISIANA.

METALLIC HUB FOR CARRIAGE-WHEELS.

Specification of Letters Patent No. 20,869, dated July 13, 1858.

*To all whom it may concern:*

Be it known that I, NATHANIEL T. EDSON, of New Orleans, parish of Orleans, and State of Louisiana, have invented a new and useful Improvement in Metallic Hubs for Wheels of Carriages and other Vehicles; and I do hereby declare the following to be a full and exact description thereof, reference being had to the accompanying drawings and to the letters of reference marked thereon.

Figure 1 is a center sectional view of my combined hubs and box with a part of the spokes placed therein. D is a flange placed on the box part and which together with a solid flange or a flange as shown at C, forms a hub or receptacle for the spokes. E, represents a nut which holds the flange D against the spokes. F, represents a section of the nut E, which can be made solid or in sections as represented, 5 the oil chamber formed between the box and nut, 4 an orifice formed through the box, several of which are necessary. 3 is an elastic washer against which the collar of the axle rests and which forms a packing between the box and nut E, thereby preventing the escape of oil from the chamber 5.

G, represents a screw-bolt with a corresponding thread, cut in the axle, which bolt, with the cone shaped collar H, connects the wheel and axle. A top view of the cone H is represented by Fig. 2, J, thereon representing a groove or channel, which when in use is kept up by the pressure of the bolt G, against its outer end.

B, Fig. 1 represents an oil chamber or cup, which in addition to make a finish for the outer end of the hub, being filled with oil, furnishes a constant supply to the cone and axle, the channel J receiving and conveying it to the interior of the box on the revolving of the wheels.

The advantage of the bolt G, over the ordinary nut screwed on the end of the axle, consists in its long thread with a short projection beyond the end of the box.

In the use of the herein described axle and box, in revolving the wheel with the outer end of the hub the highest, most of the oil will soon pass from the cup B into the chamber 5, hence the necessity of that chamber being large and well packed with a sufficient number of orifices to conduct the surplus oil into it, three is the number I recommend.

In reversing the position of the wheel and placing the outer end of the hub the lowest, a part of the oil will be returned to the cup B in revolving the wheel.

Having thus described my invention, what I claim as new therein and wish to secure by Letters Patent is—

1. The cone H, when made and applied in the manner substantially as specified.

2. The oil chamber 5 in combination with one or more orifices 4 when formed on the outer side of the box by means of a nut, substantially as represented.

3. The combination of the oil cup B with the cone H for the purposes specified.

4. I claim the chamber 5 substantially as described (in combination) with the outer cup B, for the purposes specified.

NATHL. T. EDSON.

Witnesses:
JOHN R. LAURENCE, Jr.,
I. A. LUM.